Patented Nov. 3, 1942

2,301,053

UNITED STATES PATENT OFFICE 2,301,053

PROCESS FOR THE PRODUCTION OF MELAMINE

Rudolf Köhler, Dusseldorf, Germany, assignor, by mesne assignments, to The Procter & Gamble Company, Cincinnati, Ohio, a corporation of Ohio No Drawing. Application June 17, 1939, Serial No. 279,661. In Germany August 4, 1938

10 Claims. (Cl. 260—248)

This invention relates to a process for producing melamine from dicyandiamide or from cyanamide and more particularly to the production of melamine from dicyandiamide or from cyanamide by heating them at an elevated temperature and pressures in the presence of an inert gas.

Melamine has been produced from dicyandiamide and from cyanamide in the past. The prior processes have been unsuccessful commercially, however, primarily because of unsatisfactory yields or because of technical difficulties inherent in the operation of these processes. For instance, melamine can be produced in small quantities merely by heating dicyandiamide beyond the melting point, or the yield may be increased to about 30% of the theoretically possible yield by heating the dicyandiamide in a closed vessel with concentrated ammonium hydroxide (Stollé and Krauch, Berichte, vol. 46, pp. 2337). Melamine is produced also when dicyandiamide is heated with guanidine carbonate but the yield in this instance is also unsatisfactory. See (Ostrogovich, Gazz. Chim. Ital. vol. 60, p. 648 (1930)). Better yields are obtained if a liquid ammonia solution of dicyandiamide is heated in a closed vessel at a high temperature (Franklin, E. C., Journal American Chemical Society, vol. 44, p. 504 (1922)) but difficulties are inherent in providing the anhydrous ammonia and the dry dicyandiamide necessary in the successful operation of this process. The presence of an inert liquid or solid diluent operates to improve the process using dicyandiamide and anhydrous ammonia (French Patent 814,761) but, naturally adds to the complexity of the process.

It is an object of this invention to provide a simple process for producing melamine from dicyandiamide or from cyanamide in satisfactory yields. Yet another object is to produce commercially satisfactory yields of melamine without the necessity of using anhydrous ammonia.

In accordance with this invention melamine can be produced from cyanamide and especially from dicyandiamide, with surprising high yields by heating these compounds with an inert gas at elevated temperatures and pressures. In general all gases which are inert, that is, all those which do not cause disturbing side reaction under the conditions of treatment are useful in the inventive process. In the preferred embodiments of the invention the inert gas used is hydrogen or nitrogen but satisfactory yields have been procured with other inert gases such as methane.

The process is very easily carried forward by placing the dicyandiamide or cyanamide in a suitable, closed pressure vessel and introducing the inert gas into the reaction vessel at a pressure, and heating to a temperature which produces satisfactory yields of melamine.

The amount of melamine produced depends upon the inert gas, the temperature, and the pressure used. These factors have to be correlated to provide the most satisfactory yields but temperatures from about 120° to 250° C. and beginning pressures from about 40 to 100 atmospheres have usually proven adequate for the production of satisfactory yields. During the heating of the autoclave or other pressure vessels pressures of 160 atmospheres or even greater pressures may be developed. When the conversion is complete the temperature is lowered and the pressure is released at the same time recovering the inert gas which may be used in subsequent conversions. The melamine is easily recovered in a purified form through processes of recrystallization giving yields of 85% and greater as compared to the theoretically possible yield.

The foregoing method has a decided advantage due to its simplicity of operation and due to the fact that neither the dicyandiamide nor the atmosphere within the pressure chamber has to be free of moisture as has been the case in prior commercial practices.

The folowing examples are included to illustrate the process of the invention but are not intended in any way to operate as a limitation upon the scope of the invention.

Example 1

Two hundred grams of dicyandiamide are placed in a high pressure autoclave of 1 liter capacity and nitrogen is introduced until the pressure reaches 60 atms. at room temperature. Thereupon, the autoclave is heated for four hours to a temperature of 180° to 200° C. After cooling and releasing the nitrogen from the autoclave the conversion product is purified by recrystallization from water. A yield of over 85% melamine calculated on the amount of dicyandiamide used is obtained.

Example 2

Hydrogen is introduced into an autoclave of one liter capacity, containing 200 g. dicyandiamide until the pressure in the autoclave amounts to 100 atmospheres. Then the temperature within the autoclave is increased to about 180° to 200° C. during which time the pressure rises to about 160 atmospheres. The temperature in the autoclave is maintained at about 180° to 200° C. for about four hours. Upon cooling, the conversion product may be recovered as in the preceding example giving a yield of melamine which equals 92% to 93% of that theoretically possible.

A less satisfactory yield can be obtained by operating with hydrogen at a lower pressure. For instance, when operating with hydrogen at a maximum pressure of 40 atmospheres and at a temperature of 180° to 200° C., a yield of 86% of the theoretical yield of melamine is obtained.

It should be understood that the present invention is not limited to the specific operative conditions disclosed herein but that it extends to all equivalent conditions which one skilled in the art would consider within the general purport of the instant disclosure as limited only by the tenor of the specification and the requirements of the appended claims.

I claim:

1. A process for producing melamine from a compound selected from the group consisting of dicyandiamide and cyanamide comprising introducing into a container having said compound therein an inert gas at a superatmospheric pressure, closing the container to maintain said gas therein under such pressure and heating the compound in said container at an elevated temperature.

2. A process for producing melamine from dicyandiamide comprising subjecting dicyandiamide in a chamber to superatmospheric pressure through the introduction of an inert gas into the chamber and heating the dicyandiamide in said chamber at an elevated temperature in the presence of said gas.

3. A process for producing melamine from a compound selected from the group consisting of dicyandiamide and cyanamide comprising introducing hydrogen into a vessel containing said compound to produce a superatmospheric pressure within the vessel and heating the compound in said vessel at an elevated temperature while preventing the escape of hydrogen therefrom.

4. A process for producing melamine from a compound selected from the group consisting of dicyandiamide and cyanamide comprising subjecting said compound in a pressure chamber to a superatmospheric pressure by introducing nitrogen into said chamber and heating the compound in the chamber at an elevated temperature while preventing the escape of the nitrogen therefrom.

5. The process for producing melamine from a compound of the group consisting of cyanamide and dicyanadiamide which comprises creating an initial pressure of at least 40 atmospheres within a chamber containing said compound by introducing an inert gas into the chamber and heating the compound in said chamber at an elevated temperature of about 120° to 250° C. while retaining the introduced inert gas within the chamber.

6. A process for producing melamine comprising creating a superatmospheric pressure within a container having dicyandiamide therein through the introduction of hydrogen, closing the container to maintain the hydrogen in the container under such superatmospheric pressure and heating the dicyandiamide in the closed container at an elevated temperature.

7. The process for producing melamine from a compound of the group consisting of cyanamide and dicyandiamide comprising subjecting the compound to an initial pressure of at least 40 atmospheres through the introduction of an inert gas into a chamber containing said compound and heating the compound in said chamber at an elevated temperature of 180° to 200° C. while retaining the inert gas within the chamber.

8. A process for producing melamine from a compound of the group consisting of cyanamide and dicyandiamide comprising introducing an inert gas at a superatmospheric pressure into a chamber partially filled with said compound, closing the chamber to maintain said gas therein at such pressure and heating the compound in the chamber at an elevated temperature.

9. The process for producing melamine from a compound of the group consisting of cyanamide and dicyandiamide comprising creating a superatmospheric pressure within a container, having said compound therein through the introduction of an inert gas, closing the container to maintain the inert gas in the chamber under such pressure, heating the compound in said chamber at an elevated temperature until substantial quantities of melamine are produced, allowing the container and its contents to cool, and recovering the inert gas from the container.

10. A process for producing melamine by heating a compound selected from the group consisting of cyanamide and dicyandiamide which comprises creating an initial pressure of at least 40 atmospheres within a chamber containing said compound by introducing an inert gas selected from the group consisting of hydrogen, nitrogen and gaseous hydrocarbons, into the chamber, closing the container to retain the inert gas within the chamber, and heating the container until a yield of at least 85% of the theoretically possible yield of melamine is obtained.

RUDOLF KÖHLER.